NORMAN P. GRUCZELAK
BEN C. WANG
INVENTORS
BY Robert G. Clay
ATTORNEY

TAPE TRANSPORT SYSTEM

Filed Dec. 6, 1962

NORMAN P. GRUCZELAK
BEN C. WANG
INVENTORS

BY Robert G. Clay
ATTORNEY 3,180,547
TAPE TRANSPORT SYSTEM
Norman P. Gruczelak and Ben C. Wang, Los Angeles, Calif., assignors to Ampex Corporation, Redwood City, Calif., a corporation of California
Filed Dec. 6, 1962, Ser. No. 242,821
5 Claims. (Cl. 226—118)

The present invention generally relates to magnetic tape transport systems and more particularly relates to improvements in rapid stop-start tape transport mechanisms particularly adapted for use with digital data processing equipment.

Magnetic tape systems are used for the storage and processing of signals and data in a wide variety of applications. They provide a superior combination of high speed storage capacity and low equipment cost at moderate operating speeds. For many applications, particularly in modern digital computers and data processing equipment, magnetic tape transport mechanisms must not only operate reversibly, but also must start and stop the tape in an extremely short period of time so that data can be packed closely together on the magnetic tape for maximum conservation of the tape and for maximum reduction of access time to any selected data on the tape.

The relatively large and bulky reels upon which the tape is wound and the weight of the tape itself necessarily introduce a high degree of inertia into the supply and take-up reel mechanisms of the device. Accordingly, the reel mechanisms alone ordinarily do not have a sufficiently fast stop-start characteristic, and it is usually necessary to utilize additional mechanisms to impart the desired stop-start characteristic thereto. The tape is therefore usually accelerated by pinch rollers which urge the tape against high speed capstans. However, when pinch rollers and capstans are used, some means of energy absorption or buffering is usually required to be disposed between the capstans and the tape reel mechanisms in order to prevent damage to the tape. Thus, the tape may be accelerated so rapidly that it billows or loops and subsequently snaps or is subjected to extremely high tension gradients which can appreciably stretch and damage the tape. Most of the problems in this respect are encountered in what may be termed the upstream side of the tape, i.e. the side from which the tape is drawn. Even though in a given instance billowing or looping may not cause substantial tape damage or breakage, sufficient irregularity may be introduced into the tape movement so as to disturb the recording or reproducing of data. Pressure pads have been employed on each side of the magnetic head assembly in order to hold the tape in a substantially constant relationship with the magnetic head but such pads abrade the tape and increase the amount of drag in the system. Moreover, they can result in the generation of static electricity and, therefore, introduce a number of irregularities in the recording and reproducing of data.

Buffering or compliance mechanisms of various forms have been used in modern data processing systems in order to overcome some of the described difficulties with high speed stop-start tape transport systems. In one form of compliance mechanism, a long length of tape is held as a loop within a vacuum chamber which provides an extremely low inertia coupling length so that rapid starting and stopping of the tape can be effected without tape damage. Such compliance mechanisms, however, require a considerable amount of space and relatively sensitive control by complicated and expensive servomechanisms.

Another conventional mechanical compliance mechanism employs a spring-loaded or servo-controlled arm movement which provides an adjustable loop or series of loops in the tape between the capstans and tape reels. However, movements of this kind introduce more inertia into the system than can be tolerated for very fast stop-start times.

Accordingly, it is an object of the present invention to provide improvements in a tape transport mechanism having extremely rapid starting and stopping capabilities.

It is another object of the present invention to provide improvements in a tape transport mechanism which offers control over transport of a magnetic tape which is rapidly started and stopped, said improvements maintaining the tape substantially free from excessive tensions which would tend to elongate or otherwise damage the tape.

Another object of the present invention is to provide a compact, relatively inexpensive tape buffering mechanism for use with a magnetic tape transport system adapted for application to digital processing equipment, which transport system allows movement of a magnetic tape in either direction past a magnetic head while maintaining the tape in uniform relationship with the head and which buffering mechanism smooths out and evens changes in the forces acting on the tape.

It is still a further object of the present invention to provide a low inertia tape buffering compliance mechanism which is adapted for use with rapid start-stop magnetic tape transport systems and which assures adequate control of the tape without billowing, stretching or snapping thereof.

Magnetic tape transport mechanism systems, in accordance with the present invention, achieve these and other objects by providing very low inertia compliance mechanisms alone or in combination with other compliance systems disposed between the tape drive means and each of the magnetic tape reels in the sytem. The low inertia tensioning means or compliance mechansim acts as an air spring and exerts a low but substantially constant tensioning force on the tape in the vicinity of the drive means and the magnetic head. Such low inertia compliance mechanism holds the moving tape in precise position with regard to the magnetic head without the use of tape-abrading pressure pads.

In a specific example of a magnetic tape transport system incorporating features of the present invention, pressure chambers or pockets are disposed on each side of a reversible tape driving system between driving capstans and separate mechanical multiple loop compliance mechanisms. The pressure chambers are opened at one end adjacent the path of the tape so as to receive the tape and permit the development of a loop therein. Slot orifices along each of the chambers are provided in order to pass a flow of air from each chamber. There is a pressure differential between opposite sides of the tape in the chamber which tends to draw the tape down into the chamber to a point which traverses the slot orifice in the chamber at some intermediate region thereof. The length of the loop of tape within each of the pressure chambers determines the tension which is exerted on the tape on that side of the driving mechanism. The tension is very low but varies sufficiently and in a linear manner so as to tend to maintain the length of loop in each chamber at a point of equilibrium somewhere between the ends of the slot orifice in each chamber. During rapid starting and stopping of the magnetic tape, the tape in the chamber acts against the thus provided air springs therein and is not subject to high tension gradients or reflected shocks. The tape in the chamber, due to the directed air flow, is kept away from the chamber walls so as to minimize frictional drag and wear of the tape. The tape in the chamber can be maintained in a staticless dust-free condition to facilitate ease of operation. The tape in the vicinity of the magnetic recording head is constantly held under light tension during all states of operation and accordingly is kept in engagement with the head assembly without the use of pressure pads.

A better understanding of the present invention will be had by reference to the following detailed description and the accompanying drawings of which:

Figure 1:
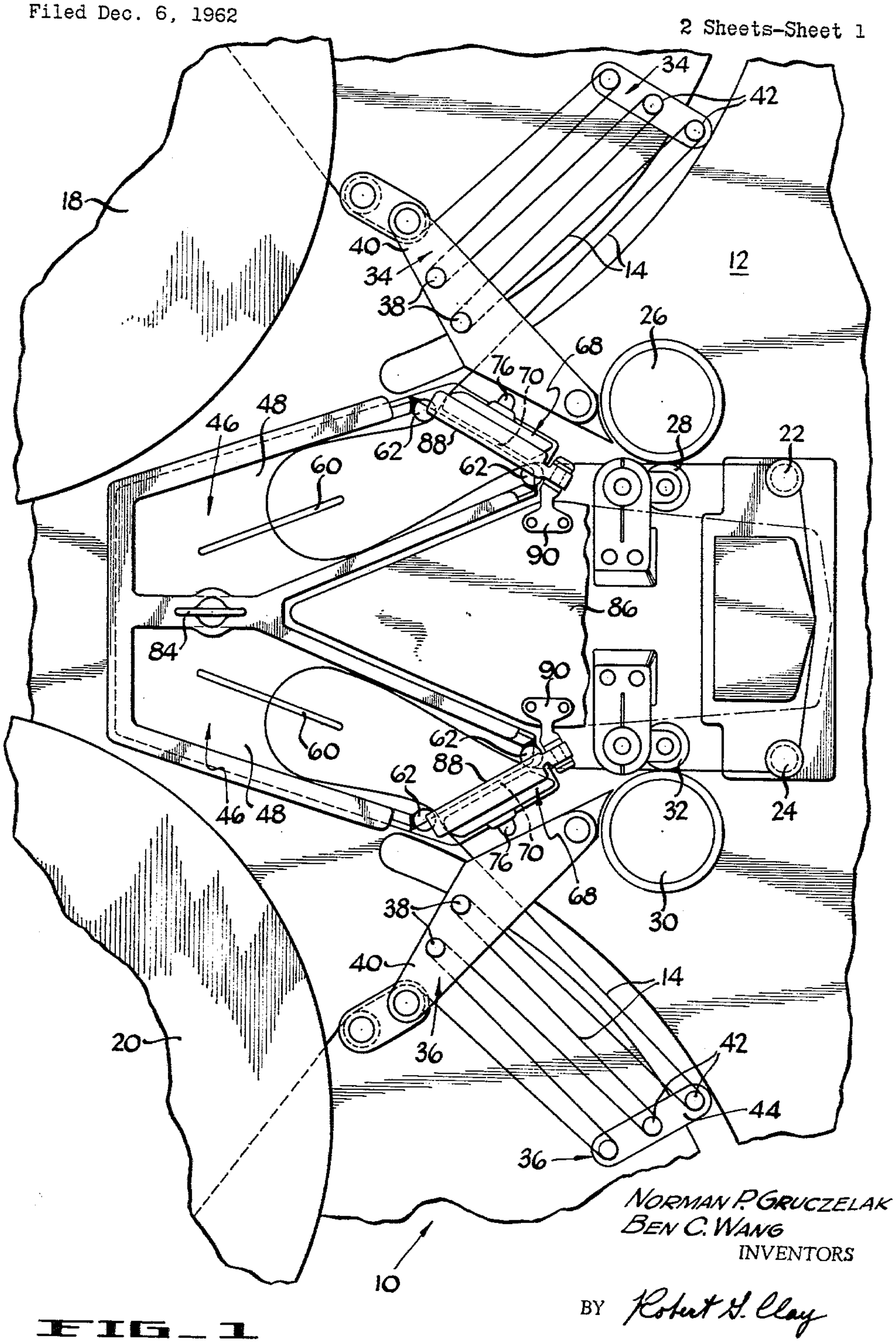
FIGURE 1 is a fragmentary side elevation of a tape transport system in accordance with the present invention.
Figure 3:
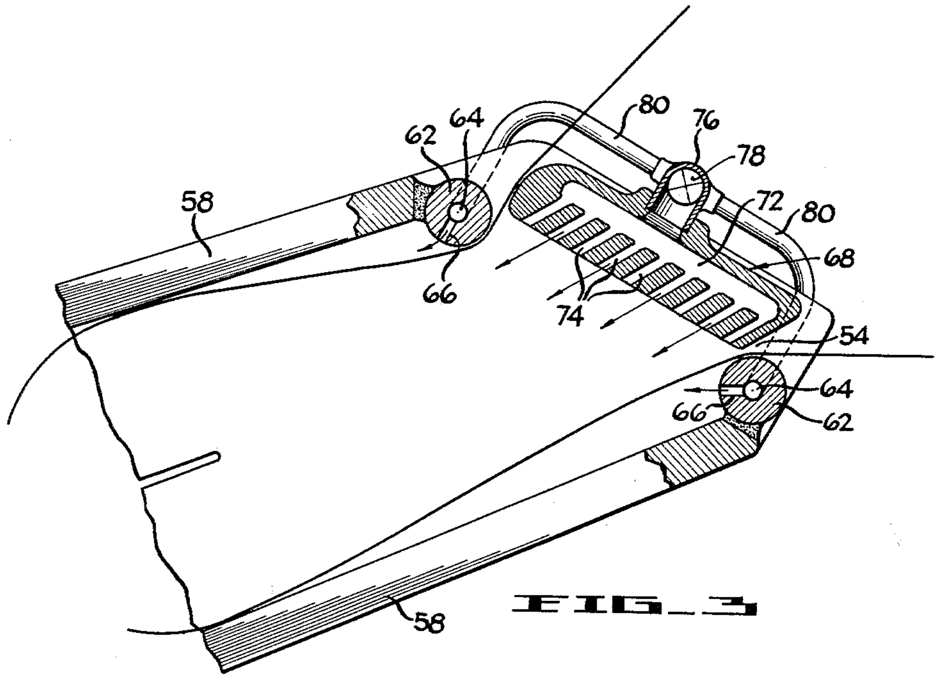
FIGURE 3 is an enlarged section of the front portion of a pressure chamber in accordance with the present invention, illustrating various operative features thereof.
Figure 2:
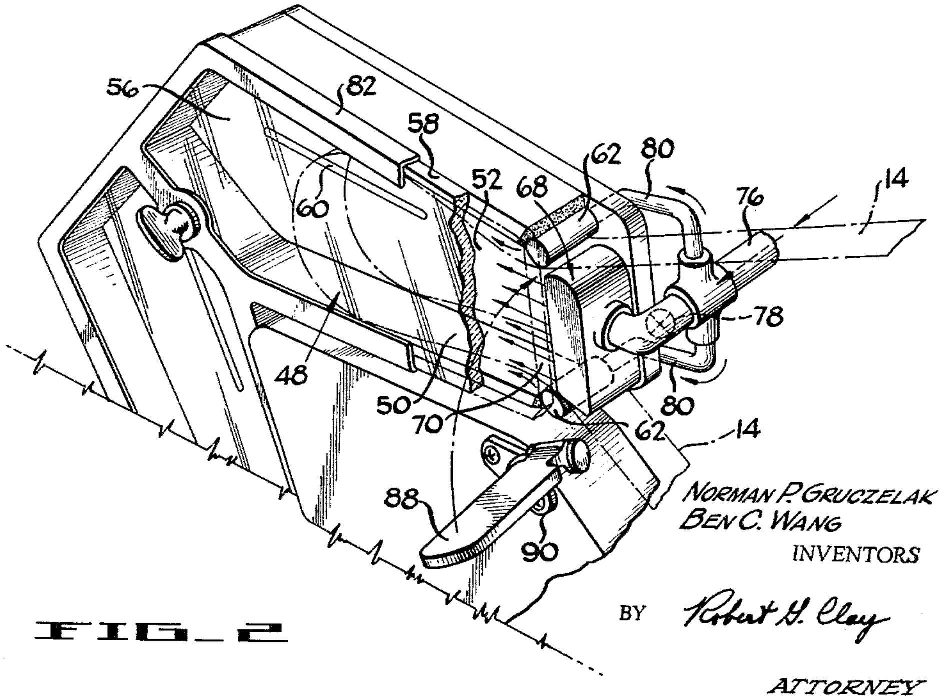
FIGURE 2 is a perspective view, partially broken away, of a pressure chamber and associated equipment utilized in the tape transport system in accordance with the present invention.

An illustrative tape transport system employing features of the present invention is set forth in accompanying FIGURES 1–3. The system is a high speed digital tape transport system 10 which has the capability of starting and stopping a tape extremely rapidly. Details of servo, preamplifier and amplifier circuitry and well known mechanical arrangements have not been illustrated in the accompanying figures in order to simplify the description of the system. Various driving motors and control mechanisms have also been omitted or have only been shown generally for the same reasons.

The principal operative units of the system 10 are mounted on a front panel 12 incorporated into cabinetry or a container in which the mechanism is positioned. A tape 14 is moved in either longitudinal direction past a recording-reproducing head assembly 16 disposed between a pair of tape reels 18 and 20 (shown partially in FIGURE 1) mounted on suitable means such as rotatable hubs (not shown). For convenience in describing the system, although tape 14 may be run in either a forward or reverse direction while recording or reproducing signals, the upper tape reel 18 illustrated in FIGURE 1 will be referred to hereinafter as the supply reel, and the lower reel 20 will be referred to as the take-up reel. Servo motors (not shown) mounted coaxially with the hubs (not shown) or other mounting means for the reels 18 and 20 and controlled by suitable servo systems (not shown), including position sensors, govern the movement of the reels 18 and 20 and the supply and winding of tape 14 during all conditions of operation of the tape transport system 10. Such conditions include continuous as well as intermittent movement of the tape in either direction.

The magnetic tape recording-reproducing head assembly 16 and the remaining elements illustrated in FIGURE 1 are advantageously positioned substantially symmetrically with respect to reels 18 and 20. For more uniform acceleration, movement and deceleration of tape 14 in both directions with respect to the head assembly 16, the tape 14 is directed into a plurality of substantially parallel paths which are substantially normal to the main tape path which crosses the head assembly 16. For this purpose, tape 14 is turned around separate guides 22 and 24 which lie on opposite sides of the head assembly 16. It will be noted, however, that no pressure pads are utilized in holding the tape 14 in a magnetic recording-reproducing position against head assembly 16.

The parallel lengths of tape 14 on each side of the head assembly 16 in each instance pass through a driving capstan and a movable pinch roller set. Thus, capstan 26 and movable pinch roller 28 are disposed on one side of the head assembly 16 and substantially identical capstan 30 and movable pinch roller 32 are disposed on the opposite side of the head assembly 16, as shown in FIGURE 1. Each of the indicated capstans is rotated by a capstan motor (not shown) in a direction which draws tape 14 away from the head assembly 16 toward the respective capstan. Accordingly, a given capstan-pinch roller set may be said to be located downstream of the head assembly 16 when that particular set is actuated. Pinch rollers 28 and 32 are moved separately into engagement with their respective capstans 26 and 30 in accordance with signal commands from the associated data processing system. Rotary or linear actuating means (not shown) of conventional types may be utilized for this purpose. In practice, the tape transport system herein disclosed operates reliably and consistently with start-up times of the order of about 0.2 millisecond.

A mechanical buffering mechanism is provided which compensates for rapid changes in the movement of the tape 14 around the capstans and relatively slower changes in the movement of the high inertia reels. The buffering mechanism consists of two adjustable multiple loop devices, designated as 34 and 36, which are substantially identical in construction. Each multiple loop device is positioned between one of the reels and the adjacent capstan of the system. Multiple loops are formed in the tape 14 at each device 34 and 36 by passage of the tape in a generally serpentine path between spaced idler rollers 38 of the multiple loop device on a fixed member 40 and spaced idler rollers 42 on a movable member 44. The movable member 44 in each instance may be, as shown in FIGURE 1, adapted to swing along an arc in the front panel 12 as is necessary to smooth out the flow of tape through the multiple loop device 34 or 36. Thus, the length of tape 14 in the multiple loop device can be changed rapidly by a relatively small amount of movement of the movable member. The position of the movable member 44 may, by a proportional or on-off system (not shown), govern the rotation of the associated tape reel 18 or 20 so that excessive stresses on the tape 14 are substantially avoided.

The multiple loop devices 34 and 36 are alone satisfactory as compliance mechanisms to compensate for stresses placed upon the tape 14 at relatively slow speeds. The inertia which they provide in the system is, however, a material factor when it is desired to utilize extremely short start-stop times of the order of, for example, about 0.2 millisecond or less. With such rapid start-stop times, the tensions which act to move the tape 14 appear, at least initially, in the form of sudden shocks which may be repeatedly reflected along the tape between the capstan and the associated multiple loop device. It is not only desirable to buffer the force of such shocks, but also to minimize the tendency introduced into the tape 14 to billow or loop, stretch and snap.

These objects can be accomplished by providing, in accordance with the present invention, extremely low inertia compliance mechanisms 46 which cooperate in a particularly effective fashion with the elements thus far described for the tape transport system 10. Two of the low inertia compliance mechanisms 46 may be provided and each of these mechanisms 46 may be positioned between one of the capstans and the adjacent multiple loop device. The size and shape of the mechanisms 46 may be such that they can be fitted symmetrically between the various described elements without requiring any increase in overall size of the tape transport system 10.

Each of the low inertia compliance mechanisms 46, one adjacent each multiple loop device, preferably operates independently to provide a self-balancing low inertia loop in the tape, which loop affords an immediate and very rapidly acting buffer. From the loop, tape 14 may be withdrawn or added as conditions require. In accordance with the invention, the low inertia compliance mechanisms 46 may be of moderate capacity, as in the system shown, where they cooperate with other compliance mechanisms, or mechanisms 46 may be of high capacity, as where they are utilized as the only compliance means for a magnetic tape transport system.

The low inertia compliance mechanisms 46 each comprise a pneumatic, loop-balancing chamber 48.

Chamber 48 includes front wall 50 and back wall 52, the latter preferably being provided by the front panel 12 of the transport system 10. The front wall 50 preferably is transparent and may be fabricated of plastic or the like, through which the operation of the tape can be observed. Chamber 48 has a tape entry end 54 which is adjacent the multiple loop mechanism 34 or 36 and the associated capstan and pinch roller assembly. The opposite end 56 is closed and is formed, as is the end 54, by appropriately configured side walls 58 disposed between the front and back walls of chamber 48. Side walls 58 are dimensioned to provide chamber 48 with a width just slightly greater than that of tape 14. As shown in FIGURE 1, the side walls 58 can diverge slightly from the tape entry end 54 to the opposite end 56 relative to a central axis. The back wall 52 includes an elongated pneumatic outlet slot 60 substantially intermediate the side walls, which slot may extend through panel 12 to atmosphere or to a suitable air conduit or the like (not shown). The front wall may, if desired, contain the outlet slot, or both the front and back walls may include such slots. The dimensions of slot 60 are controlled so that during use of chamber 48, slot 60 is sufficiently wide to prevent clogging but also sufficiently narrow to avoid producing a large pressure drop per unit length. The side walls 58 may diverge slightly, in order to compensate for non-linear slot characteristics and essentially make linear the change in tension on the tape with changes in loop length. The net effect is to provide a pressure equilibrium point for the tape normally adjacent the midpoint along the length of slot 60 in chamber 48.

At the entry end 54 of chamber 48, the front wall 50 terminates in a line across the entry end, as shown in FIGURE 1. A pair of guide pins 62 are mounted adjacent the tape path, each positioned next to a different side wall at the entry end, as best seen in FIGURE 2. Each of guide pins 62 has an internal aperture 64 and one or more outlet apertures 66, the latter directed to the interior of chamber 48. An inlet fitting 68 is mounted in the front panel 12 of the tape transport system 10 so that it extends across and essentially blocks the entry end 54 of chamber 48. As shown in FIGURE 1, inlet fitting 68 is disposed with respect to the edge of front wall 50 and pins 62 so that a tape-threading slot 70 is provided across the entry end 54 of chamber 48. As best seen in FIGURE 3, inlet fitting 68 includes an internal manifold 72 and a plurality of pneumatic outlet apertures 74 disposed across the width of entry end 54 so as to direct air centrally into the interior of the chamber. As best shown in FIGURES 2 and 3, a pneumatic conduit 76 coupled to a pneumatic source (not shown) supplies a gaseous medium, such as air, to the inlet fitting 68 through a pressure regulator 78 (FIGURE 3), and gaseous medium through bleed lines 80 (FIGURE 3) to the internal aperture 66 of the guide pins 62.

In order to provide an effective pneumatic seal for the chamber 48, a frame 82 of metal or other suitably rigid material having the outline of the side walls is mounted over each chamber 48, and is rigidly held in place, as by a wing nut 84 or the like. Means may also be provided to assure a pneumatic seal at the entry end 54 of chamber 48. In the illustrated mechanism, a pivotally mounted cover plate 86 may be provided on the front panel 12 and may extend between the V of the two chambers 48. The opposite end cover plate 86 may extend over the magnetic head device 16, as shown in dotted outline in FIGURE 1. A spring-loaded closure arm 88 (best seen in FIGURES 1 and 2) may be mounted on a bracket 90 extending from the cover plate 86 adjacent the entry end 54. Detent means (not shown) can be provided to permit the closure arm to be held away from the entry end 54, as shown in FIGURE 2, or rotated into contact with the entry end 54 to substantially close the tape-threading slot 70 between the top of the front wall 50, the guide pins 62 and the inlet fitting 68.

Each low inertia compliance mechanism 46 operates as a self-balancing pneumatic device. Air under pressure is simultaneously passed into chamber 48 through the outlet apertures 74 of the inlet fitting 68 and the outlet apertures 66 of the guide pins 62. Tape 14 is initially threaded across the entry end 54 of the chamber 48 in slot 70 and is driven down into chamber 48 by air or other gas from apertures 74. Tape 14 in chamber 48 assumes the form of a loop and extends into the region of the pneumatic outlet slot 60 in chamber 48. Air from apertures 66 is directed against the opposite side of tape 14 to that against which air from apertures 74 is directed. The air flow from the apertures 66 has the function of lifting tape 14 and keeping it away from the side walls 58 of chamber 48, so as to minimize frictional drag on the tape and so as to prevent sticking of the tape due to the build up of static electricity thereon. Thus, the loop of tape is maintained in a free-floating condition, so as to provide a smooth, substantially constant, low tension-transmitting function. The greater the force of air at entry end 54 of chamber 48, the larger the initial pressure differential between opposite sides of the tape 14, and accordingly, the greater the length of the loop of tape which will be extended into chamber 48.

In this regard, the length of the loop is self-regulating; the longer the loop, the greater the amount of slot 60 which is exposed to the high pressure side of tape 14 so that the greater is the amount of the slot 60 which is available to pass the pneumatic pressure-causing air flow from apertures 74 directly to the atmosphere or any associated reservoir and dissipate the effect thereof on tape 14 in chamber 48. Thus, this system operates to tend to maintain the loop at a point intermediate the ends of the slot at which the external light tension is balanced by the pressure differential across the tape. It is desirable that the tape be normally maintained as close to the mid-point of slot 60 as possible so that the tape length can vary considerably and yet the slot 60 can perform its functions. Thus, a linearity between drop in pressure differential between opposite sides of the loop and extent of exposure of slot 60 is desired. With larger diameter slots, however, non-linearity occurs which can be compensated for to provide essential linearity by the previous-described slight divergence in the side walls 58 from the entry end 54 to the opposite end of chamber 48.

Accordingly, a balanced, simple, inexpensive low inertia compliance mechanism is provided which has improved utility and controlled operating characteristics. The mechanism is suitable for use with or without other tape buffering mechanisms in a rapid stop-start tape transport system. The low-inertia compliance mechanism is capable of maintaining a loop of tape in a free-floating condition within a pressure chamber, without causing the loop to drag against the chamber wall or build up static electricity. The net result is an even distribution of forces acting on the tape and the desired rapid acting buffering of the tape against sudden shocks occurring during rapid stopping and starting of the tape.

While there have been described above various forms of low inertia mechanisms for magnetic tape transport systems, it will be appreciated that the invention is not limited thereto, but may include any number of alternative forms and embodiments. Accordingly, the scope of the invention should be construed in the light of the appended claims.

What is claimed is:

1. A low inertia compliance mechanism for magnetic tape transport systems, said mechanism comprising:

an elongated substantially closed chamber having an open entry end adapted to receive a magnetic tape;

means coupled to the entry end of the chamber for directing a gas flow into the chamber against one side of a magnetic tape to urge the tape into a loop within the chamber;

gas flow means adjacent the entry end for directing a gas flow against the opposite side of the tape in the chamber to maintain the loop in free-floating condition within the chamber;

the chamber defining an elongated gas flow outlet positioned to intersect the tape loop and adapted to adjust the pressure differential between opposite sides of the loop in accordance with the intersecting position of the loop.

2. A pneumatic, self-balancing, low inertia compliance mechanism for magnetic tape transport systems, said mechanism including:

a substantially closed chamber having an open tape entry end and a closed opposite end, the chamber including a front wall, a back wall and side walls, at least one of the front wall and back wall defining an elongated pneumatic outlet slot substantially intermediate the side walls;

a pair of tape guide means each positioned adjacent a different side wall at the tape entry end of the chamber, each of the tape guide means including pneumatic outlet means for directing gas under pressure along the interior surface of the sidewall of the chamber and adapted to float a magnetic tape away from the side walls of the chamber;

pneumatic inlet fitting means positioned adjacent the entry end of the chamber, and including pneumatic outlet means directed towards the interior of the chamber and adapted to direct gas under pressure against one side of an inwardly-extending loop formed in a magnetic tape disposed across the fitting means in the chamber; and pneumatic conduit means coupled to supply gas under pressure to the tape guide means and the fitting means.

3. A pneumatic, self-balancing, low inertia compliance mechanism for magnetic tape transport systems, said mechanism including:

a substantially closed elongated chamber having an open end adapted to receive a magnetic tape and a closed end, the chamber including a front wall and a back wall spaced apart by side walls a distance just sufficient to admit a width of magnetic tape, at least one of the front wall and back wall defining an elongated pneumatic outlet slot disposed substantially intermediate the side walls and adapted to intersect a loop of magnetic tape disposed in the chamber;

a pair of tape guide means, each positioned adjacent a different side wall at the open tape entry end of the chamber, each of the guide means including pneumatic outlet means for directing gas under pressure along the interior surface of the sidewalls of the chamber and adapted to be directed against one side of an inwardly extending loop of magnetic tape in the chamber so as to cause said tape to float free of the side walls of the chamber adjacent the entry end;

pneumatic inlet fitting means positioned adjacent the entry end of the chamber, and extending thereacross between the guide means, the fitting means including pneumatic outlet means directed towards the interior of the chamber across substantially all of the extent of the entry end, and adapted to direct gas under pressure against the opposite side of an inwardly extending loop formed in a magnetic tape disposed across the fitting means in the chamber; and pneumatic conduit means coupled to supply gas under pressure to the tape guide means and the fitting means.

4. A pneumatic, self-balancing, low inertia compliance mechanism for magnetic tape transport systems, said mechanism including:

a substantially closed elongated chamber having an open tape entry end and a closed opposite end and including a front wall, a back wall and side walls, at least one of the front and back walls defining an elongated pneumatic outlet slot located approximately intermediate the side walls and between the entry and closed ends at a point where the slot will intersect a tape loop disposed in the chamber, the front wall terminating at the tape entry end adjacent a tape-threading slot region;

means mounted on the chamber for sealing the chamber against pneumatic leakage;

a pair of tape guide pins, each positioned adjacent a different side wall at the tape entry end of the chamber, each of the tape guide means including pneumatic outlet means for directing gas under pressure along the interior surface of the sidewalls of the chamber;

pneumatic inlet fitting means adjacent the entry end of the chamber and including pneumatic outlet means for directing gas under pressure towards the interior of the chamber, the pneumatic inlet fitting means being positioned with respect to the end of the front wall at the tape entry end so as to define a tape-threading slot;

pneumatic conduit means interconnected with the pneumatic outlet means of the tape guide means and the pneumatic inlet fitting means so as to provide a gas flow under pressure; and means adjacent the entry end of the chamber for selectively substantially pneumatically sealing the tape-threading slot.

5. A pneumatic, self-balancing, low inertia compliance mechanism for magnetic tape transport systems, said mechanism including:

a substantially closed elongated chamber having an open tape entry end and a closed opposite end and including a front wall, a back wall and interconnecting side walls spacing the front and back walls apart a distance just sufficient to admit a magnetic tape, one of the front and back walls defining an elongated pneumatic outlet slot substantially intermediate the side walls and between the entry and closed ends at a point where the slot will intersect a tape loop disposed in the chamber, the front wall terminating at the tape entry end adjacent a tape-threading slot region;

means mounted on the chamber for sealing the chamber against pneumatic leakage;

a pair of tape guide pins, each positioned adjacent a different side wall at the tape entry end of the chamber, each of the tape guide pins including pneumatic outlet means for directing gas under pressure between the interior surface of the sidewalls of the chamber and one side of a tape disposed in the chamber for free-floating the tape in the chamber away from the walls thereof adjacent the entry end;

pneumatic inlet fitting means across substantially all of the entry end of the chamber between the guide means, and including pneumatic outlet means for directing a flow of gas under pressure toward the interior of the chamber across substantially all of the fitting means to form a loop in tape disposed across the tape entry end in the chamber, the pneumatic inlet fitting means being positioned with respect to the edge of the front wall at the tape entry end so as to define a tape-threading slot;

pneumatic conduit means interconnected with the pneumatic outlet means of the tape guide means and the pneumatic fitting means so as to provide a flow of pressurized gas therefrom; and means adjacent the entry end of the chamber for selectively pneumatically sealing and unsealing the tape-threading slot.

References Cited by the Examiner

UNITED STATES PATENTS 2,218,677 10/40 Haas ---------------- 226—97 X 2,792,217 5/57 Weidenhammer et al. ---- 226—50

3,062,464 11/62 Moose et al.

FOREIGN PATENTS 847,821 9/60 Great Britain.

ROBERT B. REEVES, *Acting Primary Examiner.*

ANDRES H. NIELSEN, *Examiner.*